US012655829B2

(12) United States Patent
Pinto Frutuoso et al.

(10) Patent No.: US 12,655,829 B2
(45) Date of Patent: Jun. 16, 2026

(54) METHOD OF CONTROLLING A ROTOR OF A WIND TURBINE TO DEAL WITH THE RISK OF BLADE ICING

(71) Applicant: VESTAS WIND SYSTEMS A/S, Aarhus N. (DK)

(72) Inventors: Ines Pinto Frutuoso, Viana Do Castelo (PT); Johnny Nielsen, Svenstrup J (DK); Fabio Caponetti, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 82 days.

(21) Appl. No.: 18/010,780

(22) PCT Filed: Jun. 14, 2021

(86) PCT No.: PCT/DK2021/050190
§ 371 (c)(1),
(2) Date: Dec. 15, 2022

(87) PCT Pub. No.: WO2021/254575
PCT Pub. Date: Dec. 23, 2021

(65) Prior Publication Data
US 2023/0243342 A1 Aug. 3, 2023

(30) Foreign Application Priority Data

Jun. 15, 2020 (DK) ............................ PA 2020 70386

(51) Int. Cl.
*F03D 80/40* (2016.01)
(52) U.S. Cl.
CPC .......... *F03D 80/40* (2016.05); *F05B 2270/32* (2013.01); *F05B 2270/323* (2013.01);
(Continued)

(58) Field of Classification Search
CPC .... F03D 80/40; F03D 80/405; F05B 2270/32; F05B 2270/323; F05B 2270/324; F05B 2270/325
See application file for complete search history.

(56) References Cited

U.S. PATENT DOCUMENTS 7,487,673 B2 * 2/2009 Ormel ..................... F03D 80/40
416/41
8,558,401 B2 * 10/2013 Girardin ................. F03D 80/40
290/44
(Continued)

FOREIGN PATENT DOCUMENTS

EP 2434146 A1 3/2012
EP 2593672 B1 3/2017
(Continued)

OTHER PUBLICATIONS

Danish Patent Office, Search Opinion for Danish Patent Application No. PA 2020 70386, dated Dec. 14, 2020.
(Continued)

*Primary Examiner* — Nathaniel E Wiehe
*Assistant Examiner* — Jason G Davis
(74) *Attorney, Agent, or Firm* — Patterson + Sheridan, LLP; Gero G. McClellan

(57) ABSTRACT

A first aspect of the invention provides a method of controlling a rotor of a wind turbine, the method comprising: obtaining a determination of whether there is ice on the rotor; obtaining one or more factors; generating an ice likelihood based on the obtained one or more factors, wherein the ice likelihood is indicative of whether it is likely that ice is building up on the rotor or thawing on the rotor; generating a confidence level based on the determination and the ice likelihood, wherein the confidence level provides an indication of the confidence that the determination is true;

(Continued)

and controlling the wind turbine based on the confidence level.

18 Claims, 7 Drawing Sheets

(52) U.S. Cl.
  CPC ... *F05B 2270/324* (2013.01); *F05B 2270/325* (2013.01); *F05B 2270/327* (2013.01)

(56) References Cited

U.S. PATENT DOCUMENTS

| | | | |
|---|---|---|---|
| 2010/0135787 A1 | 6/2010 | Scholte-Wassink | |
| 2011/0089692 A1 | 4/2011 | Girardin | |
| 2012/0226485 A1 | 9/2012 | Creagh et al. | |
| 2015/0292486 A1 | 10/2015 | Zhou et al. | |
| 2017/0058871 A1 | 3/2017 | Movsichoff et al. | |
| 2019/0003461 A1 | 1/2019 | Zhou et al. | |
| 2019/0003463 A1 | 1/2019 | Buggy et al. | |

FOREIGN PATENT DOCUMENTS

| | | | |
|---|---|---|---|
| EP | 3150850 A1 | 4/2017 | |
| JP | 2020002835 A | 1/2020 | |

OTHER PUBLICATIONS

Danish Patent Office, Search Report for Danish Patent Application No. PA 2020 70386, dated Dec. 14, 2020.
International Search Report and Written Opinion for PCT Application No. PCT/DK2021/050190, dated Sep. 9, 2021.

* cited by examiner

600

METHOD OF CONTROLLING A ROTOR OF A WIND TURBINE TO DEAL WITH THE RISK OF BLADE ICING

FIELD OF THE INVENTION

The present invention relates to a method of controlling a rotor of a wind turbine.

BACKGROUND OF THE INVENTION

It is a known problem that ice or other debris may build up on a wind turbine blade and may reduce the aerodynamic performance of the blade. It is therefore important to be able to determine the presence of this ice, even when its direct detection is not possible.

SUMMARY OF THE INVENTION

A first aspect of the invention provides a method of controlling a rotor of a wind turbine, the method comprising: obtaining a determination of whether there is ice on the rotor; obtaining one or more factors; generating an ice likelihood based on the obtained one or more factors, wherein the ice likelihood is indicative of whether it is likely that ice is building up on the rotor or thawing on the rotor; generating a confidence level based on the determination and the ice likelihood, wherein the confidence level provides an indication of the confidence that the determination is true; and controlling the wind turbine based on the confidence level.

The confidence level may provide an indication of the confidence that the determination is true at the time of obtaining the one or more factors. Generating a confidence level may comprise integrating a function dependent on any time dependent factors of the one or more factors. Generating a confidence level may further comprise scaling the function based on time independent factors of the one or more factors.

The method may further comprise repeating the steps of obtaining one or more factors, generating an ice likelihood and generating a confidence level, so as to update the confidence level with time: Updating the confidence level with time may include updating the confidence level with time so as to drive the confidence level towards the ice likelihood.

Generating the ice likelihood based on the obtained one or more factors may comprise using any time dependent factors of the one or more factors to generate a number, and scaling the number based on any time independent factors of the one or more factors to generate the ice likelihood.

The one or more factors may comprise one or more of the following: temperature; humidity; rotor speed; wind speed; time elapsed since obtaining the determination; wind turbine state; pressure; height of nacelle above ground; height of nacelle above sea level; and geographic location of the wind turbine.

The time dependent factors may include temperature; humidity; rotor speed; wind speed; time elapsed since obtaining the determination; wind turbine state; and pressure.

The time independent factors may include height of nacelle above ground; height of nacelle above sea level; and geographic location of the wind turbine.

Controlling the wind turbine based on the confidence level may comprise generating an ice detection signal on the basis of the confidence level; and controlling the wind turbine on the basis of the ice detection signal.

The determination may be obtained during one of the following operational states of the wind turbine: production; idling; start-up and stopped.

The confidence level may be a non-binary value.

The confidence level may be a number between 0 and 1 inclusive. The confidence level may be a percentage.

The method may further comprise: determining the accuracy of the confidence level; and adjusting an algorithm for generating the confidence level based on the determined accuracy.

Determining the accuracy of the confidence level may comprise comparing the confidence level to a measurement of ice on the rotor. The measurement of ice on the rotor may be a direct or indirect measurement.

A further aspect of the invention provides a wind turbine comprising a rotor and a controller configured to perform the method of the first aspect.

Yet a further aspect of the invention provides a computer program product comprising software code adapted to perform the method of the first aspect when executed on a data processing system

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
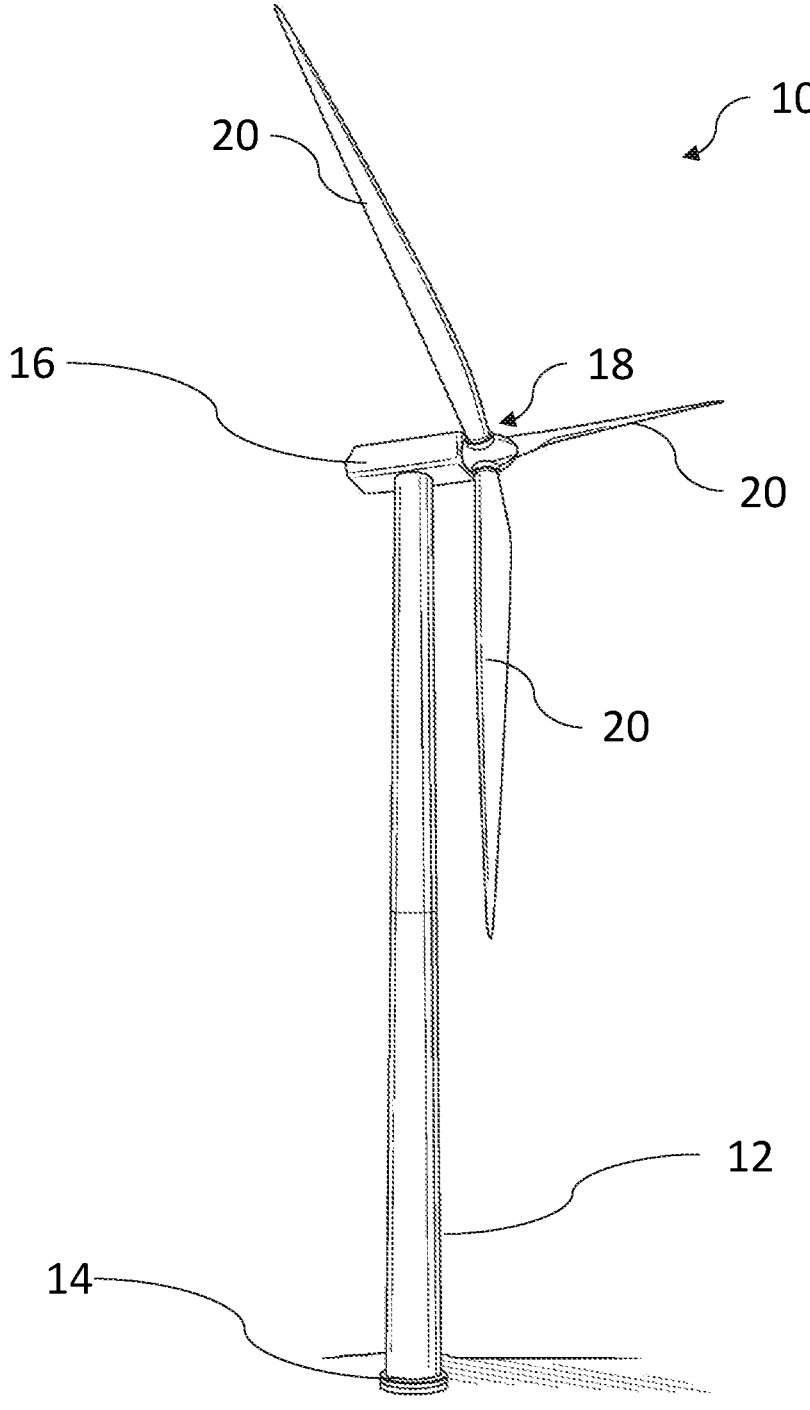
FIG. 1 shows a wind turbine.

FIG. 1 shows a general view of a wind turbine 10 having a main tower 12 extending upwardly from a foundation 14 and supporting a nacelle 16. A rotor 18 is rotatably mounted on the nacelle 16. The rotor 18 has blades 20 extending radially outwardly from it and wind incident on the wind turbine 10 may rotate the blades 20 and thereby rotate the rotor 18. The rotor 18 may transfer rotational movement to a generator housed within the nacelle 16, which may generate electricity. The electricity generated may then be transferred to a grid or other power supply network outside the wind turbine 10. The wind turbine may also comprise various sensors, which are not shown, such as anemometers, and power meters, as well as encoders for measuring the rotational speed of the rotor 18.

Ice, sand, or other debris may build up on the wind turbine blades 20 and the aerodynamic characteristics of the blade may therefore change. Accordingly, the torque transferred to the generator and the amount of electricity produced may be reduced. The lift and/or drag curves of the blade may also change, and the blade may stall unexpectedly.

The aerodynamic performance of the blades may also be reduced or otherwise changed due to abrasion of the leading edge or other damage to the wind turbine blade such as by bird strikes or airborne debris.

Figure 2:
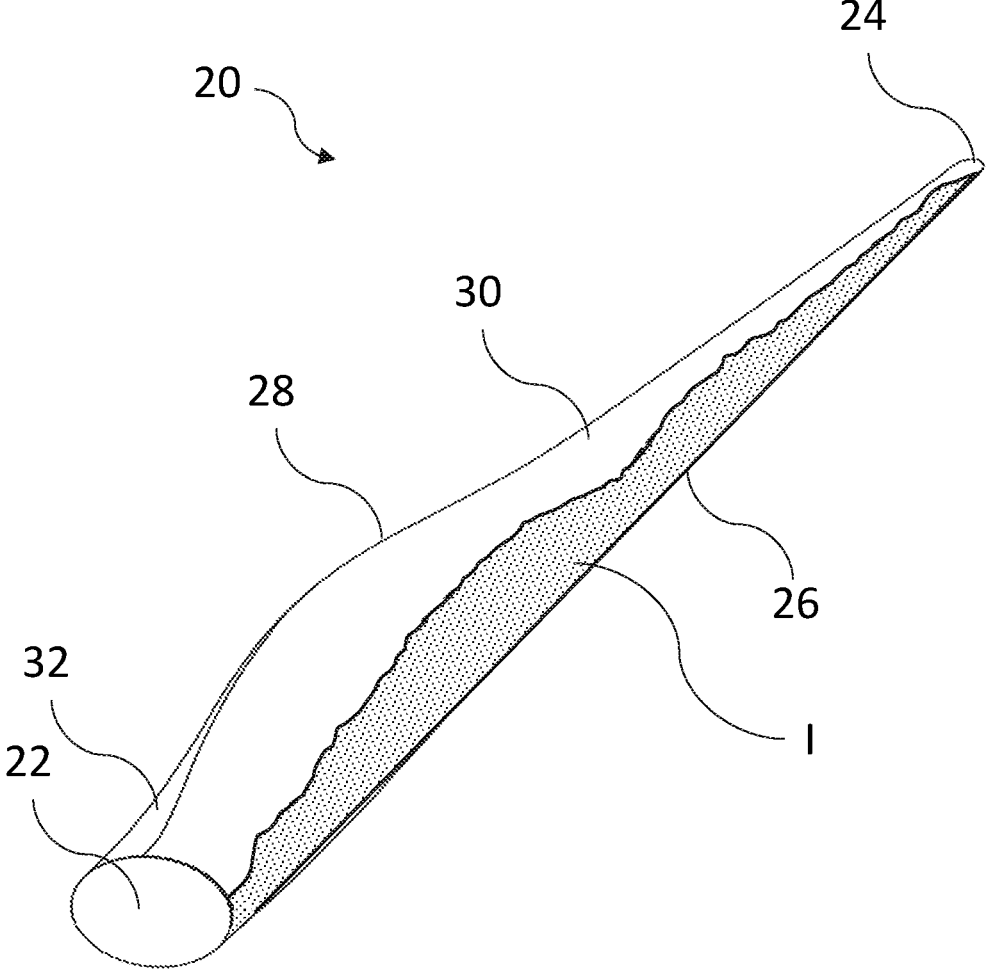
FIG. 2 shows a wind turbine blade.

An example of a degraded wind turbine blade is shown in FIG. 2. The wind turbine blade 20 extends from a root end 22 to a tip end 24, having a leading edge 26 extending therebetween, the leading edge 26 being arranged to face into the wind as the blade moves, and a trailing edge 28 which is arranged to face out of the wind. The wind turbine blade 20 also has two major aerodynamic surfaces: a pressure surface 30 and a suction surface 32.

In FIG. 2, ice I can also be seen, which has built up on the pressure surface 30 of the wind turbine blade 20 near the leading edge 26. It will, however, be understood that ice and other debris may build up anywhere on the wind turbine blade such as at the trailing edge 28 or may be localised at the root end 22 or at the tip end 24.

In order to obtain data over a range of wind turbine blade degradation states, wind turbine blades may be simulated or modelled with a range of different debris conditions and may be categorised according to their reduction in power coefficient. Data pertaining to a wind turbine blade having a particular degradation state may therefore not be indicative of data for a specific wind turbine blade having a specific debris build up pattern, but may be a heuristic generally indicating expected wind turbine blade characteristics.

The presence or absence of ice on the rotor can be determined when the turbine is in a production state, i.e. when the turbine is producing power. For example, ice can be detected by noting a significant difference between an expected level of power generation and an observed level of power generation.

Figures 3A, 3B:
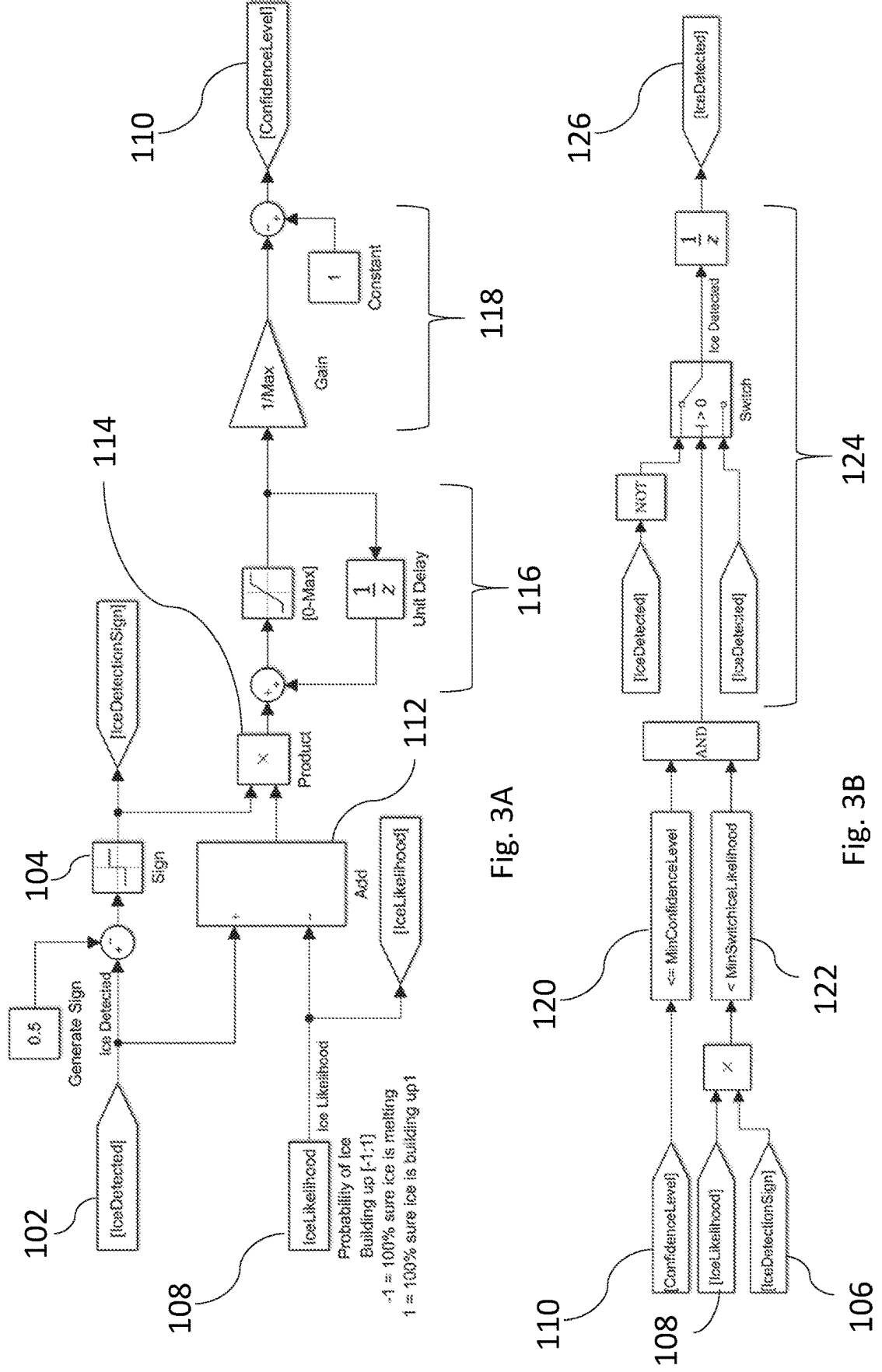
FIG. 3A shows a flow diagram illustrating an algorithm for generating a confidence level.
FIG. 3B shows a flow diagram illustrating an algorithm used for switching a determination.

FIG. 3A shows a flow diagram illustrating an algorithm used to generate a confidence level that provides an indication of the confidence in the presence or absence of ice.

Firstly, an initial determination 102 of whether there is ice on the rotor is made. This determination can be made using the aforementioned technique, when the turbine is in a production state, for example. The sign 106 of the determination is generated 104. In other words, if ice is detected, the sign is considered to be positive and if no ice is detected, the sign is considered to be negative.

One or more factors are obtained. An ice likelihood 108 is generated based on the one or more factors. The factors are one or more of: temperature; humidity; rotor speed; wind speed; time elapsed since obtaining the initial determination; wind turbine state; pressure; height of nacelle above ground; height of nacelle above sea level; and geographic location of the wind turbine. The ice likelihood 108 is a number between −1 and +1, and is indicative of whether it is likely that ice is building up on the rotor or thawing on the rotor. An ice likelihood of −1 is indicative that there is a 100% confidence that ice is thawing on the rotor, and an ice likelihood of +1 is indicative that there is a 100% confidence that ice is building up on the rotor.

A confidence level 110 is generated based on the determination 102 and the ice likelihood 108. Generating the confidence level 110 comprises the steps of combining the determination 102 and the ice likelihood 108; incorporating the determination sign 106; iteratively updating the result; and normalising the result.

The determination 102 and the ice likelihood 108 are combined 112 through addition. The determination sign 106 is incorporated 114 through multiplication. The result is iterated 116 in order to drive the result (which is indicative of the confidence level 110) towards the ice likelihood 108 over time. In this manner, the confidence level 110 is iteratively updated with time. The result is then normalised 118 to make it a number between 0 and 1. The output of this normalisation step is the confidence level 110.

The confidence level 110 provides an indication of the confidence that the determination 102 is true. The confidence level 110 is a number between 0 and 1, wherein 1 indicates that the determination is true with 100% confidence and 0 indicates that the determination is true with 0% confidence, i.e. it is unknown whether the determination is true or not.

As an example, if the initial determination was that there is ice on the rotor, a confidence level 110 is generated that indicates with what confidence it can be said that there is ice on the rotor. This will likely be at a later time than the initial determination, but may be at the same time, in which case the confidence level can be used to affirm the initial determination based on the factors that affect ice on the rotor.

The determination is a binary determination, i.e. it is either determined that there is ice on the rotor or it is determined that there is no ice on the rotor. The confidence level is initially an indication of the confidence that one of these outcomes is true. If the confidence level drops below a threshold, the confidence level is "switched" to become an indication of the confidence that the other outcome is true. For example, following an initial determination that there is ice on the rotor, the confidence level initially provides an indication of the confidence that there is still ice on the rotor. However, after the confidence level drops below a threshold of 0.1, the determination is switched and the confidence level is recalculated, so that it is now indicative of the confidence that there is no ice on the rotor. In this respect, the determination is also a variable, of which the initial determination is just the first value.

This process is described with reference to FIG. 3B. The confidence level 110 begins as a confidence level that there is ice on the rotor. The confidence level 110 is compared to a threshold 120, i.e. a minimum confidence level, and the ice likelihood 108 (including the ice likelihood sign 106) is compared against a minimum ice likelihood at which switching will take place 122. If it is determined that the confidence level 110 is less than or equal to the threshold, and the ice likelihood 108 is less than the minimum switching ice likelihood 122, the algorithm is switched 124 so that the confidence level 110 becomes a confidence level that there is no ice on the rotor. This is effected by switching the determination from "ice" to "no ice" on the rotor. The switched determination 126 is then fed through the algorithm described in FIG. 3A.

Figure 4:
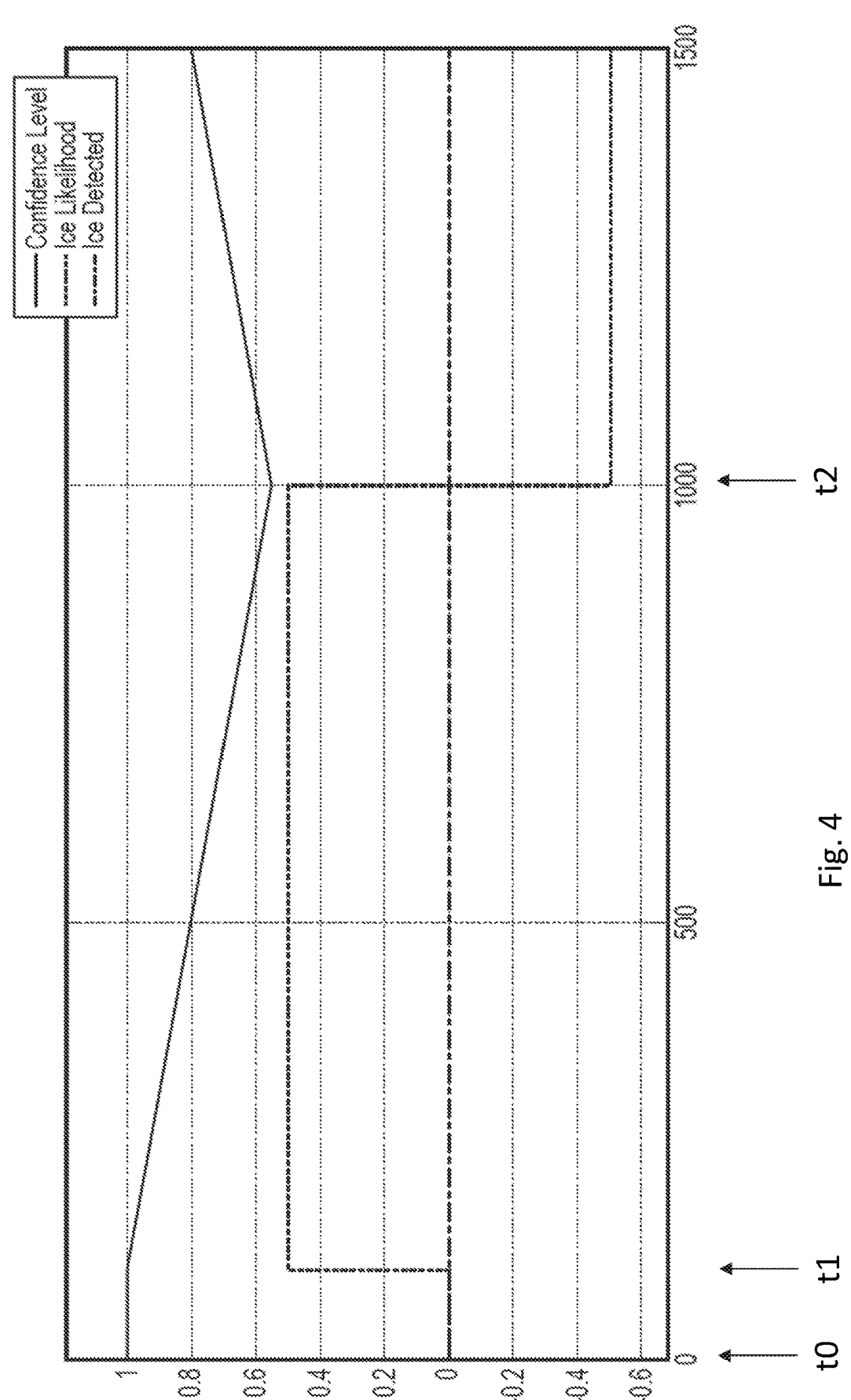
FIG. 4 shows a graph illustrating a first scenario according to the invention.

FIG. 4 illustrates how the values discussed above are iterated and updated with time in a first scenario. At a first time t0, a determination of whether there is ice on the rotor is obtained. It is determined that there is no ice on the rotor, so the "ice detected" line is at 0 instead of 1. At t0, the presence of ice is able to be monitored and is therefore known, so the confidence level is 1 (i.e. 100% confidence). At time t1, the ability to monitor whether there is ice on the rotor is removed, perhaps because the turbine changes from operating in a production state to an idling or stopped state. At this time, a number of factors are obtained, these factors being factors that may affect the presence, build up or thawing of ice on the rotor. An ice likelihood is generated based on these factors, and the ice likelihood indicates that it is likely that ice is building up on the rotor with a 50% confidence. The confidence level therefore begins to drop, as it can no longer be said that there is no ice with 100% confidence, especially in view of the fact that it is likely that ice is building up on the rotor.

At time t2 the factors are obtained again. The factors may be monitored continuously or may be obtained at discrete intervals. The ice likelihood is updated based on the factors, and the updated ice likelihood indicates that it is 50% likely that ice is thawing. At this point therefore, the confidence level begins to rise, as the thawing of ice would be consistent with the determination that there is no ice on the rotor.

Figure 5:
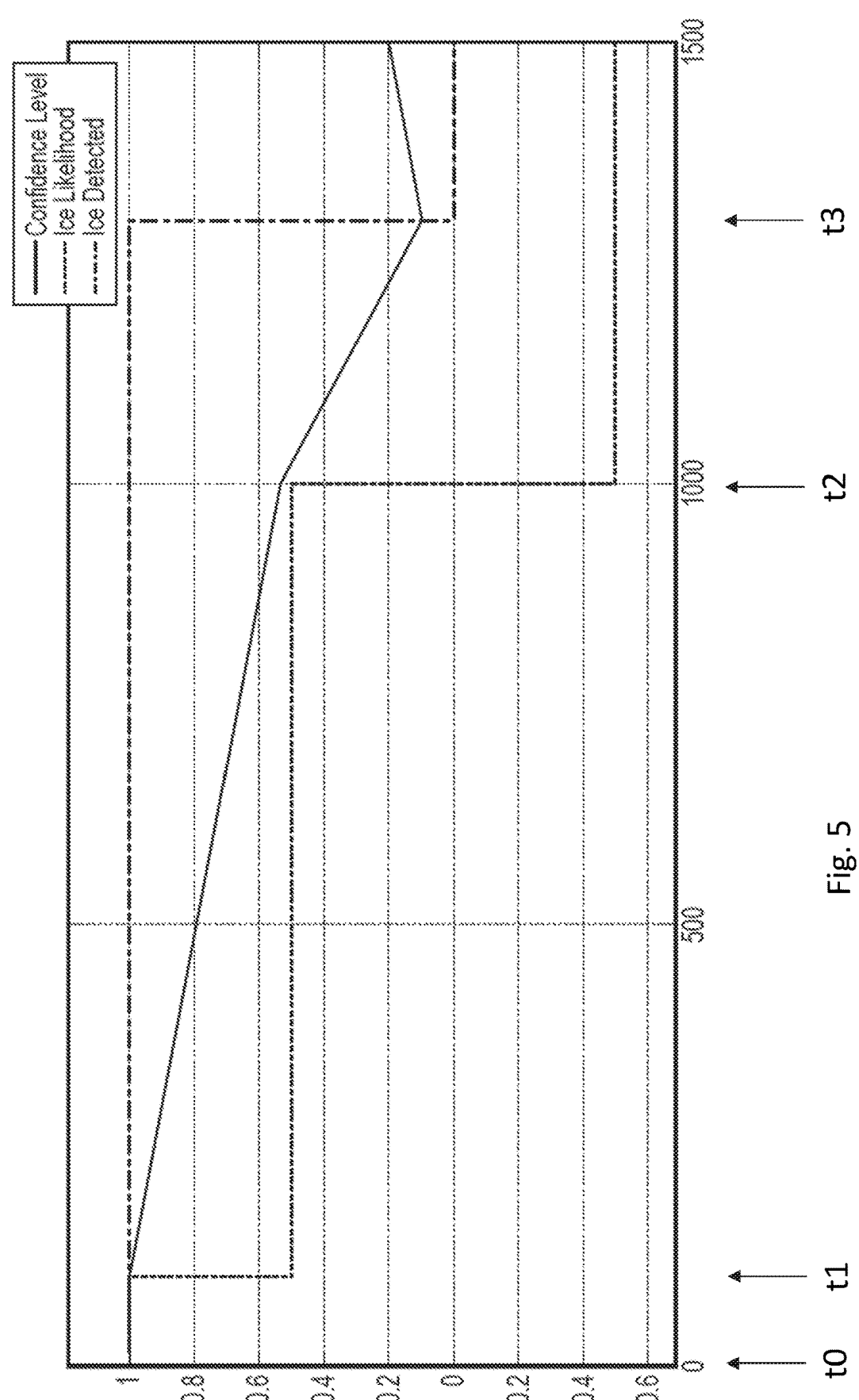
FIG. 5 shows a graph illustrating a second scenario according to the invention.

FIG. 5 illustrates how the values are updated with time in a second scenario. At a first time t0, a determination of whether there is ice on the rotor is obtained. In this scenario it is determined that there is ice on the rotor, so the "ice detected" line is at 1 instead of 0. As with the previous scenario, at t0, the presence of ice is able to be monitored and is therefore known, so the confidence level is 1 (i.e. 100% confidence). At time t1, the ability to monitor whether there is ice on the rotor is removed, perhaps because the turbine changes from operating in a production state to an idling or stopped state. At this time, a number of factors are obtained, these factors being factors that may affect the presence, build up or thawing of ice on the rotor. An ice likelihood is generated based on these factors, and the ice likelihood indicates that it is likely that ice is building up on the rotor with a 50% confidence. As the ice likelihood indicates that the conditions are favourable for ice to be present, the confidence level remains high, however as there is only a 50% confidence that the ice is building up, it cannot be said with certainty that there is ice on the rotor. The confidence level therefore begins to drop with a shallow gradient, being driven towards the ice likelihood. The longer it is uncertain whether ice is building up or thawing, the lower the confidence level becomes.

At time t2, the ice likelihood is updated based on the monitored factors, and it indicates that it is likely that ice is now thawing with a 50% confidence. This makes the determination that there is ice present more unlikely, and so the confidence level that there is ice drops with a steeper gradient.

At time t3, the confidence level falls to 0.1, which is the threshold for switching the determination from "ice" to "no ice". Therefore, the determination is switched from 1 to 0, and the confidence level becomes a confidence that no ice is present on the rotor. As the ice likelihood continues to indicate that it is likely ice is thawing, the confidence level that there is no ice on the rotor rises.

Figure 6:
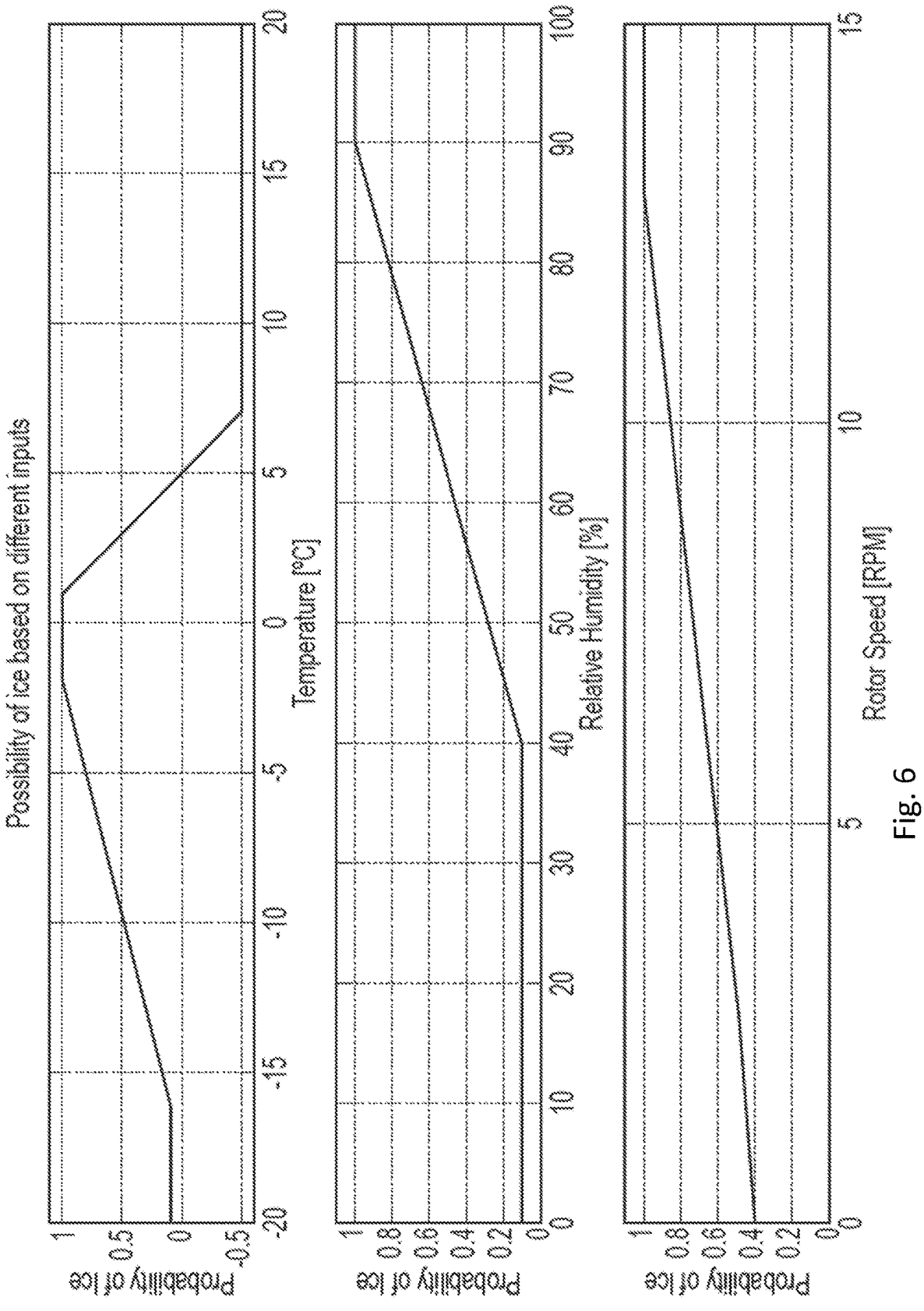
FIG. 6 shows a number of graphs illustrating how ice presence is likely to be affected by a number of factors.

FIG. 6 illustrates the relationship between probability of ice presence and a number of relevant factors. It can be seen that as temperature increases above −16° C., the probability of ice increases, up to 1° C., after which the probability sharply falls off. Beyond 5° C., it is likely that ice is thawing. Probability of ice is low at low humidity due to the lack of water vapour in the air. The probability of ice increases after 40% humidity, up to 90% humidity, at which point ice is extremely likely. The probability of ice on the rotor increases with increasing rotor speed also.

Figure 7:
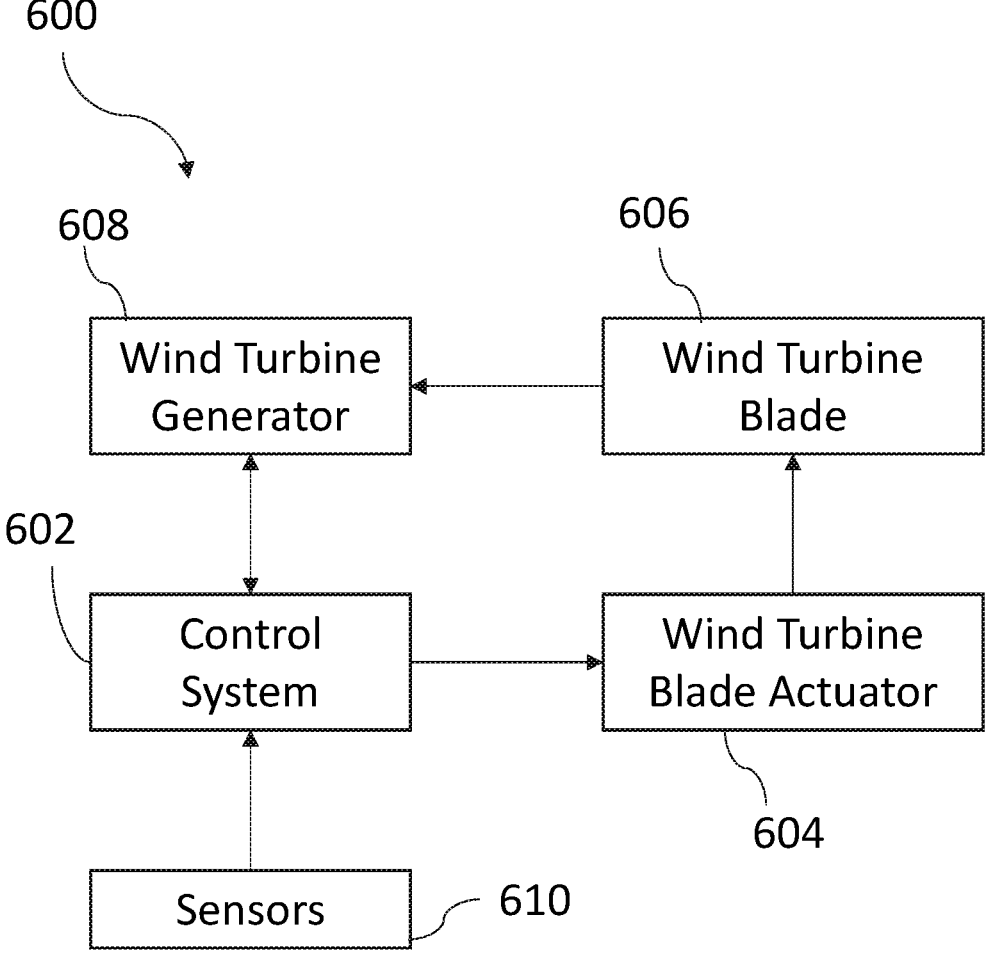
FIG. 7 shows a schematic control diagram showing certain features of a wind turbine

FIG. 7 shows a schematic control diagram showing certain features of a wind turbine 600 which may be used within the method described above. The wind turbine may comprise a control system 602. The control system 602 may have a memory, which may store data pertaining to the measured factors affecting ice presence and may store instructions for carrying out the method. The control system 602 may also comprise a processor for carrying out the method.

The control system 602 may control a wind turbine blade actuator 604, which may be a motor arranged to alter a pitch angle of a wind turbine blade 606. The wind turbine blade 606 may provide rotational movement to a wind turbine generator 608, which may generate electricity. The amount of electricity generated may therefore provide a measure of the torque from the wind turbine blade 606. The wind turbine generator 608 may supply electrical power to an electrical grid and the control system 602 may determine the power output by the wind turbine blade by measuring the power output to the grid by the wind turbine generator 608 and compensating for any power losses within the wind turbine 600.

The wind turbine 600 may also have sensors 610, which may measure one or more factors affecting ice presence, such as temperature, humidity and wind speed. The sensors 610 may provide such data to the control system 602.

The control system 602 may have a memory and a data processing system. The memory stores a computer program product comprising software code adapted to determine a confidence level of ice on the rotor when executed on the data processing system.

Thus, the control system 602 provides a system configured to generate a confidence level using the method of the previously discussed Figures.

Although the invention has been described above with reference to one or more preferred embodiments, it will be appreciated that various changes or modifications may be made without departing from the scope of the invention as defined in the appended claims.

The invention claimed is:

1. A method of controlling a rotor of a wind turbine, the method comprising:
obtaining a determination of whether there is ice on the rotor;
obtaining one or more factors;
generating an ice likelihood based on the obtained one or more factors, wherein the ice likelihood is indicative of whether it is likely that ice is building up on the rotor or thawing on the rotor;
generating a confidence level based on the determination and the ice likelihood, wherein the confidence level provides an indication of the confidence that the determination is true; and
controlling the wind turbine based on the confidence level to modify operation of the wind turbine, wherein controlling the wind turbine based on the confidence level comprises altering a pitch angle of a blade of the rotor.

2. The method of claim 1, comprising repeating the obtaining of the one or more factors, the generating of the ice likelihood, and the generating of the confidence level, so as to update the confidence level with time.

3. The method of claim 1, wherein generating the ice likelihood based on the obtained one or more factors comprises using any time dependent factors of the one or more factors to generate a number, and scaling the number based on any time independent factors of the one or more factors to generate the ice likelihood.

4. The method of claim 3, wherein the time dependent factors include temperature; humidity; rotor speed; wind speed; time elapsed since obtaining the determination; wind turbine state; and pressure.

5. The method of claim 3, wherein the time independent factors include height of nacelle above ground; height of nacelle above sea level; and geographic location of the wind turbine.

6. The method of claim 1, wherein the one or more factors comprise one or more of the following: temperature; humidity; rotor speed; wind speed; time elapsed since obtaining the determination; wind turbine state; pressure; height of nacelle above ground; height of nacelle above sea level; and geographic location of the wind turbine.

7. The method of claim 1, wherein controlling the wind turbine based on the confidence level comprises generating an ice detection signal on the basis of the confidence level; and controlling the wind turbine on the basis of the ice detection signal.

8. The method of claim 1, wherein the determination is obtained during one of the following operational states of the wind turbine: production; idling and stopped.

9. The method of claim 1, wherein the confidence level is a non-binary value.

10. The method of claim 9, wherein the confidence level is a number between 0 and 1 inclusive.

11. The method of claim 1, further comprising:

determining an accuracy of the confidence level; and adjusting an algorithm for generating the confidence level based on the determined accuracy.

12. The method of claim 11, wherein determining the accuracy of the confidence level comprises comparing the confidence level to a measurement of ice on the rotor.

13. A wind turbine, comprising:

a tower;

a nacelle disposed on the tower;

a rotor extending from the nacelle and having a plurality of blades disposed on a distal end thereof; and a controller configured to perform an operation, comprising:

obtaining a determination of whether there is ice on the rotor;

obtaining one or more factors;

generating an ice likelihood based on the obtained one or more factors, wherein the ice likelihood is indicative of whether it is likely that ice is building up on the rotor or thawing on the rotor;

generating a confidence level based on the determination and the ice likelihood, wherein the confidence level provides an indication of the confidence that the determination is true; and controlling the wind turbine based on the confidence level to modify operation of the wind turbine, wherein controlling the wind turbine based on the confidence level comprises altering a pitch angle of a blade of the rotor.

14. The wind turbine of claim 13, wherein the operation further comprises repeating the obtaining of the one or more factors, the generating of the ice likelihood, and the generating of the confidence level, so as to update the confidence level with time.

15. The wind turbine of claim 13, wherein generating the ice likelihood based on the obtained one or more factors comprises using any time dependent factors of the one or more factors to generate a number, and scaling the number based on any time independent factors of the one or more factors to generate the ice likelihood.

16. A computer program product comprising a non-transitory memory storing software code which, when executed on a data processing system, performs an operation, comprising:

obtaining a determination of whether there is ice on a rotor of a wind turbine;

obtaining one or more factors;

generating an ice likelihood based on the obtained one or more factors, wherein the ice likelihood is indicative of whether it is likely that ice is building up on the rotor or thawing on the rotor;

generating a confidence level based on the determination and the ice likelihood, wherein the confidence level provides an indication of the confidence that the determination is true; and controlling the wind turbine based on the confidence level to modify operation of the wind turbine, wherein controlling the wind turbine based on the confidence level comprises altering a pitch angle of a blade of the rotor.

17. The computer program product of claim 16, wherein the operation further comprises repeating the obtaining of the one or more factors, the generating of the ice likelihood, and the generating of the confidence level, so as to update the confidence level with time.

18. The computer program product of claim 16, wherein generating the ice likelihood based on the obtained one or more factors comprises using any time dependent factors of the one or more factors to generate a number, and scaling the number based on any time independent factors of the one or more factors to generate the ice likelihood.

* * * * *